3,305,860
DIGITAL SYNCHRONIZER
Bernarr H. Humpherys, Escondido, Calif., assignor to the United States of America as represented by the Secretary of the Navy
Filed Jan. 26, 1965, Ser. No. 428,276
2 Claims. (Cl. 343—6.5)

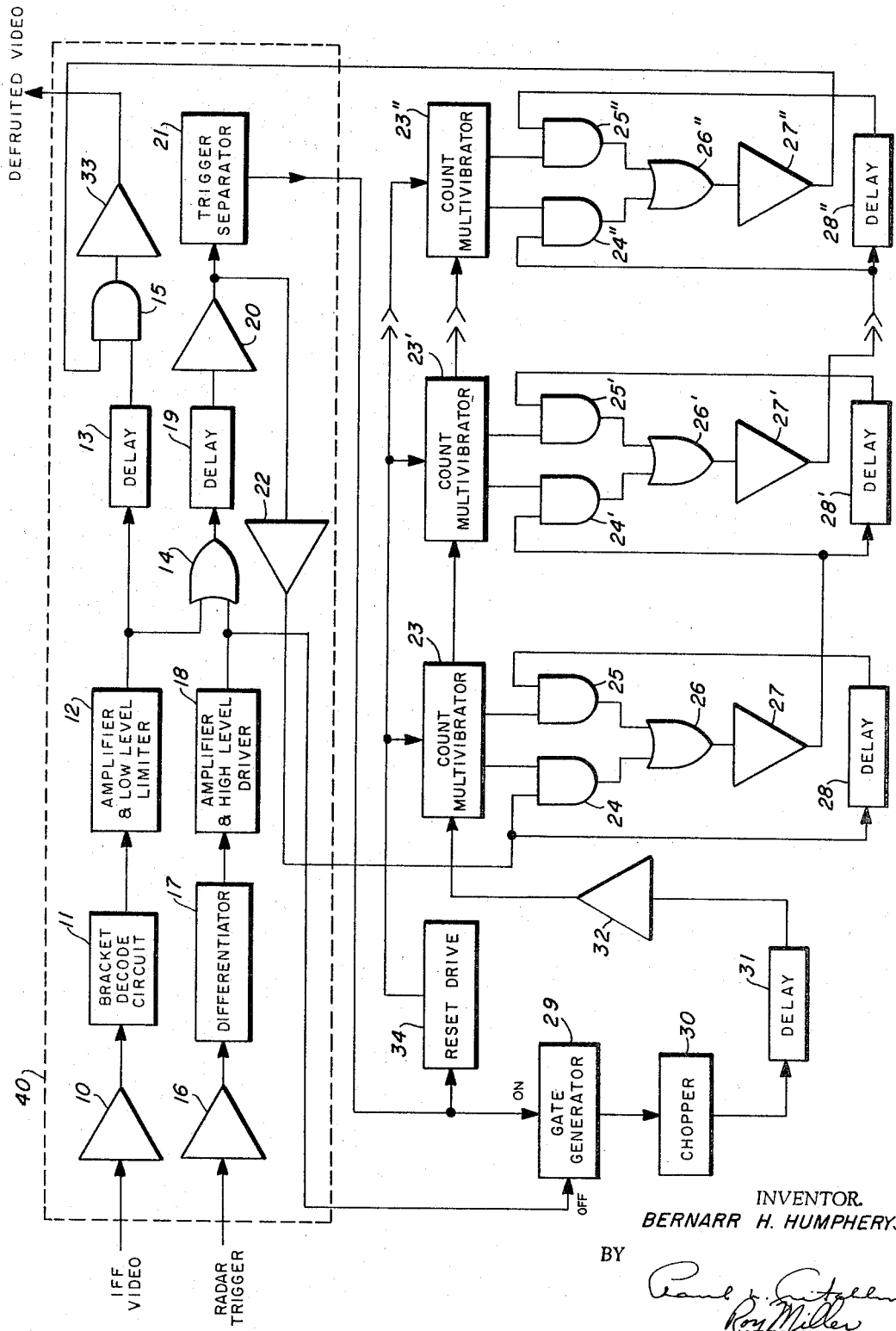

The invention described herein may be manufactured and used by or for the Government of the United States of America for governmental purposes without the payment of any royalties thereon or therefor.

This invention relates to a digital synchronizer and more particularly, to a digital synchronizing means adapted for use with an IFF defruiter and associated radar system and specifically, to a digital synchronizing means for use with an IFF defruiter so that the delay interval of the IFF defruiter corresponds to the time interval between successive radar system trigger pulses.

The present invention is intended for use with an IFF defruiter such as that described in copending application Serial No. 181,209, filed March 20, 1962, now Patent No. 3,182,310. The copending application describes an IFF defruiter which is intended for use with an associated radar system. In the radar system described above the main trigger pulses are provided by the IFF defruiter i.e., the radar system is slaved to the defruiter. However, in normal use, it is desirable that the main radar provide its own system trigger rather than being slaved to an associated equipment. The optimum equipment would be one which in addition to being slaved to the radar system would also be compatible with presently existing radar systems, many of which utilize time jitter in their transmitting techniques.

An object of the present invention is to provide a practical digital synchronizer.

An additional object of the present invention is to provide a digital synchronizer so that an IFF defruiter may be used with a radar system.

A further object of the present invention is to provide a digital synchronizing means which makes IFF defruiters compatible with presently existing radar systems.

An additional object of the present invention is to provide a digital delay line synchronizer which is capable of measuring the difference interval between the time an IFF signal is stored in a storage device and the interval of time between trigger pulses and adjusting the delay interval of the storage device to correspond to the time interval between trigger pulses.

Other objects and many of the attendant advantages of this invention will be readily appreciated as the same becomes better understood by reference to the following detailed description when considered in connection with the accompanying drawing wherein:

The figure illustrates a preferred embodiment in block diagram of the present invention.

In the accompanying figure the structure within dotted line 40 essentially relates to the IFF defruiter which is utilized to remove fruit from the display apparatus of an associated radar system. Unseparated IFF video is coupled into an amplifier 10 and bracket decoded in a bracket decode circuit 11, which comprises an AND gate for coinciding the start and stop pulses, of the IFF train. The start and stop pulses are separated by 20.3 microseconds in the video train. The bracket decode pulse is then coupled through an amplifier and low-level limiter 12 the output of which is coupled as an input to a delay increment 13 which is provided to compensate for circuit delays. The same output from the amplifier 12 is also coupled as one input to an OR gate 14.

The main radar trigger pulses are coupled in through an amplifier 16 and differentiated in a differentiating circuit 17. Circuit 17 is utilized to narrow the pulse and this is accomplished by catching the leading edge of the pulse to provide a spike which is coupled to an amplifier and high level driver 18. The output of the amplifier 18 also comprises an input to the OR gate 14.

The output of the OR gate 14 drives a delay line 19, the length of which is chosen to be less than the least time interval between the repetition rate of any radar system in use. The reason for this will become apparent as the digital synchronizer is described in detail.

The output of the delay line 19 is amplified in amplifier 20 and forms the input to a trigger separator 21 which base clips the bracket decode pulses and is also coupled as an input to an amplifier 22 the output of which is coupled to the circuitry comprising the digital synchronizer.

The output of the incremental delay 13 is coupled as one input to a coincidence circuit 15. The other input to the coincidence circuit 15 is derived from the synchronizing circuitry. The output of the coincidence gate 15 is coupled through amplifier 33 and comprises the defruited bracket pulse trains which may be displayed on a radar scope.

Essentially, the digital synchronizer functions to measure the difference between the length of the delay line 19 i.e. the storage time, and the period of time between successive radar trigger pulses. The radar trigger pulses are not necessarily coming into the system at regular intervals in that time jitter may be used in the associated radar system which would mean that the time interval between successive trigger pulses would vary from pulse to pulse.

The counting circuitry is broken up into multiples of an initial delay and in the present instance only three counting circuits are shown.

Each counting circuit comprises a count multivibrator such as 23; two AND gates as at 24 and 25 which receive an enable gate from the multivibrator 23 depending on whether the multivibrator is "off" or "on" respectively; an OR gate as at 26 which receives its inputs from the output of the AND gates 24 and 25; an amplifier as at 27 which amplifies the output of the OR gate 26 and a delay line 28.

The subsequent counting elements are primed in the figure i.e. 23', 23" to indicate the second and last count multivibrators shown.

In the figure, delay line 28 is shown as being 0.2 microsecond long; and 28' and 28" as multiples i.e., 0.4 microsecond and 409.6 microseconds, respectively.

The first delay element 28 could be chosen to be any practical length and the subsequent delay elements would be multiples of the first.

The output of the trigger separator comprises radar trigger pulses which have been stored in the delay line 19. These pulses are coupled as the "on" pulse to a difference gate generator 29. The "off" input to the gate generator is coupled from the output of the amplifier 18 which would correspond to radar triggers which have not been delay in the delay line 19. The difference gate generator in this manner measures the time difference between the storage time of delay line 19 and the interval between main trigger pulses by generating a pulse as long as the time difference.

The output of the gate generator 29 is coupled to a pulse chopper 30 which chops up the pulse interval between the "on" and "off" times of the gate generator 29. In the present instance the chopper chops into 0.2 microsecond increments however, it is to be understood that this might be any appropriate time interval.

The output of the chopper 30 is then delayed a small amount in delay line 31 to make such all multivibrators are reset before counting begins; amplified in amplifier 32 and coupled to the first count multivibrator 23 which has an output coupled to multivibrator 23'. An output of multivibrator 23' is coupled to multivibrator 23''.

The output of the amplifier 22, which comprises the IFF bracket decode pulses which have been delayed in the delay line 19, is coupled as an input to the AND gate 24 and also as an input to the first delay line increment 28. The output of the delay line increment 28 is coupled as another input to the AND gate 25.

The output of the first counting increment i.e. the output of amplifier 27 is coupled as the input to a succeeding AND gate 24' and the input to succeeding delay increment 28'. This basic connection continues for the rest of the counting increments. The counting circuits function such that the delay line increments are either inserted in series with the IFF bracket pulses or bypassed depending on the state of the associated count multivibrator.

The output of the last amplifier 27'' is coupled as the other input to the AND gate 15.

Also comprising part of the digital synchronizing circuitry is a reset drive circuit 34 which derives its input from the output of the trigger separator 21 and which has its output coupled to the respective count multivibrators as a reset pulse for the multivibrators.

In operation, the first trigger pulse from amplifier 18 which is coupled as the "off" input to the difference gate generator 29 does nothing to the generator 29 because it is already "off." However, the delayed trigger from separator 21 turns the gate generator "on" and the next main trigger from amplifier 18 turns gate generator 29 "off." This interval between "on" and "off" is chopped into 0.2 microsecond pulses and the number of pulses counted in multivibrators 23, 23' and 23'' etc.

For instance, if the "on" "off" interval were 0.2 microsecond the multivibrator 23 would be set and AND gate 25 enabled. The bracket decode pulse appearing at the output of amplifier 22 which is coupled to the input of the delay increment 28 and the AND gate 24 would be delayed to the delay increment 28 in that AND gate 24 is not enabled, i.e., the count multivibrator is in the "on" state and AND gate 25 rather than AND gate 24 is receiveiving the enabling pulse at that time. The succeeding multivibrators 23, 23' are still in the "off" condition and therefore associated AND gates 24' and 24'', respectively, are enabled which means that the delay increments 28' and 28'', respectively, are bypassed. Therefore, the output of the delay increment 28 is effectively coupled to the input of the AND gate 15.

Thus, when the next bracket decode pulse appears and if it is in synchronism with the delayed pulse at the input to AND gate 15 an output appears which is amplified in amplifier 33 and this output would correspond to defruited bracket decode pulses which might be utilized on an associated PPI (pulse plan position indicator).

In order to reset the multivibrators a trigger pulse is coupled from the trigger separator 21 to the reset driver 34 the output of which is coupled to the multivibrator are resetting them to an initial state after the count is completed and the appropriate delay inserted.

Obviously many modifications and variations of the present invention are possible in the light of the above teachings. It is therefore to be understood that within the scope of the appended claims the invention may be practiced otherwise than as specifically described.

What is claimed is:

1. A digital synchronizer for synchronizing an IFF defruiter with an associated radar system;

said IFF defruiter including means for receiving and storing IFF signals and comparing the received signals against subsequently received signals;

said IFF defruiter having an output comprising a bracket decode pulse;

said IFF defruiter also having an input comprising a radar trigger from an associated radar system;

the digital synchronizer comprising;

difference gate generator means having an on-input and an off-input;

said gate generator means being operable to measure the time difference between the storage time of the IFF defruiter and the interval between trigger pulses from the associated radar system;

the on-input to the gate generator comprising a signal from the IFF defruiter which has been stored;

the off-input to the gate generator means comprising the radar trigger pulses which have not been stored;

pulse chopper means coupled to the output of the gate generator means for chopping the output of the gate generator means between the on and off interval into a series of discrete pulses having equal time intervals;

a multiplicity of counting means operatively connected to the output of the pulse chopper for counting the number of pulses at the output of the pulse chopper means;

each of the counting means having associated with it coincidence means and a delay increment;

the coincidence means deriving inputs from the outputs of the respective counting means;

the respective delay increments receiving outputs from the coincidence means and being associated with the respective coincidence means in such a manner that the delay increment may be switched into and out of series with the output of the bracket decode pulse from the output of the IFF defruiter;

said digital synchronizer functioning to measure the time difference between the length of the storage interval and the radar trigger pulses so that delay increments are inserted in series with the IFF video until the storage time of the IFF video matches the interval between radar triggers.

2. A digital synchronizer as set forth in claim 1 wherein;

said counting means comprise count multivibrators which are connected in series with the output of the pulse chopper means;

each of said count multivibrators having at least a pair of coincidence means associated with it;

one of said coincidence means having an off-enable input which is derived from the associated count multivibrator;

the other of said coincidence means having an on-enable input derived from the associated count multivibrator;

another input to said off-coincidence means comprising IFF video which has bypassed the delay increment associated with the respective count multivibrator;

another input to said on-coincidence means comprising IFF video after having been delayed in the delay increment associated with the count multivibrator;

said off-coincidence means and on-coincidence means being operative to switch into and out of said associated delay line increment into and out of series with the IFF video.

References Cited by the Applicant

UNITED STATES PATENTS 2,671,897   3/1954   Woodbury.
2,701,305   1/1955   Hopper.
2,802,051   8/1957   Prior et al.
2,821,696   1/1958   Shiowitz et al.
2,884,616   4/1959   Fillebrown et al.

RODNEY D. BENNETT, *Primary Examiner.*

D. C. KAUFMAN, *Assistant Examiner.*